July 31, 1956     J. A. MERRIMAN     2,757,039
LOAD BRACING DOG ASSEMBLY
Filed April 13, 1955
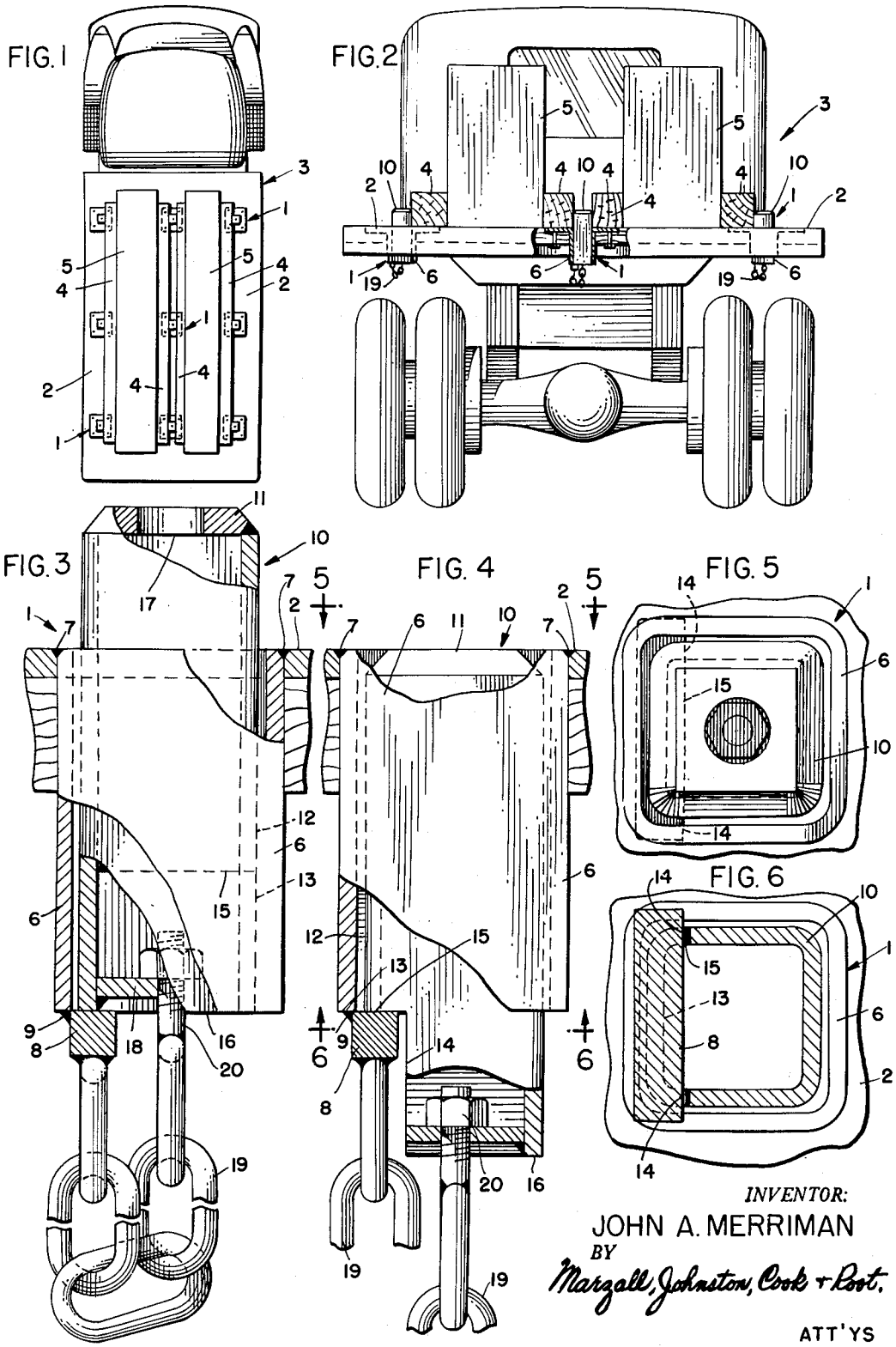
INVENTOR:
JOHN A. MERRIMAN
BY
Mazzall, Johnston, Cook + Root.
ATT'YS United States Patent Office 2,757,039
Patented July 31, 1956

2,757,039

LOAD BRACING DOG ASSEMBLY

John A. Merriman, Chicago, Ill.

Application April 13, 1955, Serial No. 501,148

9 Claims. (Cl. 296—43)

This invention relates to a load bracing dog assembly for vehicles, such as automobile trucks and trailers, freight cars, ships, airplanes and the like.

The invention relates in general to an assembly comprising an enclosure or sleeve, defining a depending well structure, which is adapted to have its upper surface mounted flush with the top of the floor or deck, so that during normal use a flat smooth surface is presented, and bags or other tearable or frangible articles will not be damaged or torn. A dog is arranged within the tubular sleeve or well and extends downwardly into the well with its top normally flush with the well top. The dog is adapted to be lifted out of the sleeve or well, and then turned one hundred eighty degrees and finally dropped into the well and come to rest on a supporting abutment, whereby the dog will be held in raised or elevated position a predetermined distance above the floor. The dog has a cut-out to form a step which is engaged by the abutment on the sleeve, causing the dog to be in its normal lowered position flush with the top of the well and the floor. When the abutment engages the bottom edge of the dog, it will be in its raised position extending above the top of the floor and the top of the well for bracing or supporting purposes. The dog is preferably connected to the sleeve or well structure by a chain, or other means, so that the cooperating parts will always be connected together and not become misplaced or lost.

The primary object of the present invention is the provision of new and improved dog assembly for use on vehicles, the dog being cut away along one side, and its adjacent closure walls, to provide a stepped projection intermediate its upper and lower ends to be engaged by a supporting bar or abutment to maintain the dog in normal lowered inoperative position, or the dog may have its lower end engaged by the supporting bar or abutment to maintain the dog in its raised or upper operative position.

A further object of the invention consists in providing a sleeve or well structure, preferably multisided in cross section, into which well a dog is arranged, the dog being preferably made of metal and having a flush bottom surface and a stepped surface spaced a predetermined distance above the lower end of the dog, whereby the step is adapted to engage a transverse bar extending across the bottom of the well to maintain the dog in normal lowered position with its upper end flush with the upper surface of the floor and with the top of the well or sleeve, the dog, when having its normal bottom surface engaging the bar, extending upwardly and partly out of the sleeve to provide a bracing abutment.

Numerous other objects and advantages will be apparent throughout the progress of the specification which is to follow.

The accompanying drawing illustrates a certain selected embodiment of the invention, and the views therein are as follows:

Fig. 1 is a detail plan view showing a motor vehicle, such as a truck, having a bed or floor, and embodying the invention;

Fig. 2 is an end elevation of the truck of Fig. 1 and showing the dog assembly arranged in its raised operative supporting position;

Fig. 3 is a detail elevational view, partly in section, showing the dog assembly with the dog in raised operative position for bracing and supporting purposes;

Fig. 4 is a view similar to Fig. 3 but showing the abutment in its normal inoperative lowered position, flush with the floor of the truck, the dog having been turned one hundred eighty degrees in the well;

Fig. 5 is a detail top plan view looking in the direction of the arrows 5—5 of Fig. 4; and Fig. 6 is a detail transverse sectional view on the line 6—6 of Fig. 4.

The particular construction herein shown for the purpose of illustrating the invention comprises a bracing dog assembly 1, which is adapted to be mounted on the floor or deck 2 of a truck or trailer body 3. There may be several assemblies 1 arranged in transverse and longitudinal rows so as to provide supports or bracing members for articles. The assemblies may engage timbers 4 for preventing the shifting of articles 5, such as boxes or crates, Figs. 1 and 2.

Each assembly 1 comprises an elongated hollow sleeve or well 6 which is preferably made of metal and multi-sided in cross section. In cases where the floor 2 of the vehicle 3 is made of metal, the well or sleeve 6 may be welded, as indicated at 7, to the metal floor 3, Fig. 3, but should the floor or bed 2 be made of wood, the well 6 may have a peripheral plate (not shown) which may be recessed into the floor so that the upper end of the plate will be flush with the floor or bed; or the flange may rest on top of the floor if preferable. The well 6 is specifically shown as being a hollow metal four-sided tubular sleeve, although it may be of any desired or preferred configuration. A transverse bar 8 is arranged across the bottom of the well, at one side thereof, to provide an abutment stop and support. The bar or abutment 8 is made of metal, and is welded to the well along one side and at its opposite ends as indicated at 9, Figs. 3 and 4.

An elongated dog 10 is adapted to be arranged inside the elongated sleeve or well 6, and has substantially the same configuration as the interior of the well, but slightly smaller, so as to permit free and easy movement of the dog 10 into and out of the well 6. The dog 10 is also made in the form of a sleeve, being made of metal, and is hollow throughout, except it is closed at its top, as indicated at 11, Fig. 3. One side 12 of the dog is cut away at 13, and the adjoining sides are cut away at 14, 14 to provide a step 15 which extends beyond the cut-away sides 14.

The step 15 forms a supporting ledge which is adapted to be engaged by the abutment bar 8, and, therefore, supports the dog 10 within the well 6, with the top 11 of the dog flush with the top of the well, the lower end of the dog projecting a predetermined distance outwardly from the bottom of the well 6 as shown in Fig. 4. The dog is then in its normal inoperative position and there are no projections extending above the floor 2 to interfere with loading or unloading, and eliminating any possibility of soft material or bags becoming snagged or torn.

In cases, however, where certain material such as flat strips of steel, bars or other material is to be hauled, the dogs are moved to their raised position as shown in Fig. 3, whereupon the material may be supported between abutments and prevented from shifting. In Figs. 1 and 2 the raised dogs 10 may be used with timbers or other lumber which may be placed against the sides of the dogs, and cases or crates may be arranged between the timbers for securing the crates 5 and preventing shifting.

Each dog 10, when in its raised position, has its normal bottom 16 supported on the bar or abutment 8, as shown in Fig. 3. Each dog 10, therefore, may be moved from raised to normal lowered position by turning the dog one hundred eighty degrees. To change from one position to another the dog is raised out of the well and then turned before inserting it back into the well. In Fig. 4 the dog is shown in its raised position with the bottom of the dog supported on the bar 8. However, when the dog is to be brought to lowered position it is pulled out of the well and turned one hundred eighty degrees, whereupon the ledge or step 15 will rest on the bar and the dog will be in its retracted position, Fig. 5.

For ease in pulling the dog out of the well, the top 11 thereof may be provided with a hole 17, Fig. 3, to receive a tool or the operator's fingers to raise the dog from the well 6.

A cross plate 18, Fig. 3, may be secured within the dog at its bottom, and one end of a chain 19 may be secured to the plate through the medium of a bolt and nut 20. The other end of the chain 19 may be secured to the well, such as by welding a link of the chain to the cross abutment 8. Instead of a chain, any other suitable attaching means may be provided just so that the two members 6 and 10 will be secured together and kept from being misplaced or lost. The chain 19 or other member should be long enough, of course, to permit the dog to be lifted out clear of the top of the well. The dog 10 may be a solid metal stepped plug instead of constituting a hollow member as shown.

The invention provides a simple inexpensive dog assembly constituting relatively rough parts of sturdy construction. The few and simple parts may be readily and economically manufactured and are not likely to get out of order or become damaged by hard usage. The parts may be of a configuration other than shown, just so that they perform the purpose intended and embody a support adapted for engagement with either a stepped part of the dog or a lower surface thereof. The flexible connection of the dog and well keeps the parts from becoming separated and misplaced and therefore always ready for use.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. In combination with a flat deck for vehicles and the like, a bracing dog assembly comprising a plurality of elongated hollow sleeves forming wells mounted on the deck and projecting downwardly from the top of the deck, an abutment mounted interiorly of a well adjacent the bottom thereof, and a dog receivable in the well and having several surfaces at different levels at its lower end for selective engagement with the abutment, one of said surfaces engaging the abutment when the dog is arranged in a certain position, a said abutment engaging a different surface on the dog when the dog is turned about its vertical axis and replaced into the well.

2. In combination with a flat deck for vehicles and the like, a bracing dog assembly comprising a plurality of elongated hollow sleeves forming wells mounted on the deck and projecting downwardly from the top of the deck, an abutment mounted interiorly of a well adjacent its lower end, and a dog having a bottom surface to engage the abutment when the dog is arranged in a predetermined position in the well and resting on said surface, said dog being cut away adjacent its lower end to provide an additional supporting surface engageable with the abutment when the dog has been turned about its vertical axis a predetermined amount.

3. In combination with a flat deck for vehicles and the like, a bracing dog assembly comprising a plurality of elongated hollow sleeves forming wells mounted on the deck and projecting downwardly from the top of the deck, an abutment mounted interiorly of each well adjacent its lower end, and a dog for each well and having a projecting ledge above the bottom of the dog and engaging the abutment in the well when the dog is in a predetermined position to maintain said dog in retracted position, said dog having a bottom surface engageable with the abutment when the dog is positioned in the well in another predetermined position, said dog being raised in the well when the dog is in said latter position.

4. In combination with a flat deck for vehicles and the like, a bracing dog assembly comprising a plurality of elongated hollow sleeves forming wells mounted on the deck and projecting downwardly from the top of the deck, an abutment mounted on each well and extending across the lower end thereof, and an elongated dog for said wells having an upper end of a predetermined size and a lower end of a reduced size forming a supporting ledge at the point where the reduced lower end of the dog joins with its upper end, said ledge engaging the abutment when the dog is arranged in the well in a predetermined position to lower the top of the dog with respect to the top of the well, the bottom of the dog engaging the abutment and causing the dog to be raised upwardly in the well when the dog is arranged in another predetermined position in the well.

5. A dog assembly for use for bracing purposes on the deck of a vehicle and the like comprising a hollow elongated sleeve forming a well, an elongated dog arranged in the well, said dog being cut away near its lower end to form a supporting ledge, an abutment across the well adjacent the lower end of the well and extending into said well, said dog having its bottom engageable with the abutment to maintain the dog upwardly in raised position and projecting out of the well a predetermined distance when the dog is arranged in the well in a predetermined position, said supporting ledge of the dog engaging the abutment to lower the dog to bring the top of the dog flush with the top of the well when the dog is arranged in the well in another predetermined position.

6. A dog assembly for use for bracing purposes on the deck of a vehicle, and the like, comprising a hollow elongated sleeve forming a well, an elongated dog arranged in the well, said dog being cut away intermediate its upper and lower ends to form a supporting ledge, an abutment across the well adjacent the lower end of the well, said dog having a bottom surface engageable with the abutment to raise the dog upwardly out of the well a predetermined distance when the dog is arranged in the well in a predetermined position, said supporting ledge of the dog engaging the abutment to lower the dog to bring the top of the dog flush with the top of the well when the dog is arranged in the well in another predetermined position, and means connecting said well and dog together to prevent misplacement of the parts, said last named means being of a length sufficient to permit the dog to be removed from the well for positioning the dog to said predetermined position.

7. A dog assembly for use for bracing purposes on the deck of a vehicle and the like, comprising a hollow elongated sleeve forming a well, a hollow elongated dog arranged in the well, said dog being cut away along one side and at the side walls connected thereto to form a supporting ledge, and an abutment across the well adjacent the lower end of the well, said dog having its bottom engageable with the abutment to raise the dog upwardly out of the well a predetermined distance when the dog is arranged in the well in a predetermined position, said supporting ledge of the dog engaging the abutment to lower the dog to bring the top of the dog flush with the top of the well when the dog is arranged in the well in another predetermined position, said dog being provided with means at its upper end to permit engagement by a tool or the hand of an operator to move the dog upwardly outwardly of the well.

8. A dog assembly for use in bracing on the deck of a vehicle and the like, comprising a hollow elongated sleeve, an abutment projecting inwardly of the sleeve, a dog removably arranged in said sleeve, said dog being smaller in size at its lower end than its upper end and forming an abutment engaging surface engageable with the abutment to support the dog in retracted position when the dog is raised and arranged in a predetermined position, the lower end of the dog extending below the abutment when the dog is in said latter position, said dog being adapted to be removed from said sleeve and turned one hundred and eighty degrees and then reinserted in the sleeve to bring a part of the lower end of the dog into abutment engaging position with the abutment whereby the dog will become elevated and project a predetermined distance out of the top of the sleeve.

9. A dog assembly for use in bracing on the deck of a vehicle and the like, comprising a hollow elongated square sleeve, an abutment projecting inwardly of the sleeve, a square hollow dog removably arranged in said sleeve, said dog being smaller in size at its lower end than its upper end and forming an abutment engaging surface engageable with the abutment to support the dog in retracted position when the dog is raised and arranged in a predetermined position, the lower end of the dog extending below the abutment when the dog is in said latter position, said dog being adapted to be removed from said sleeve and turned one hundred and eighty degrees and then reinserted in the sleeve to bring a part of the lower end of the dog into abutment engaging position with the abutment whereby the dog will become elevated and project a predetermined distance out of the top of the sleeve.

References Cited in the file of this patent

UNITED STATES PATENTS 2,682,426     Staffe _____ June 29, 1954